United States Patent [19]

Clemens et al.

[11] 4,429,329
[45] Jan. 31, 1984

[54] REMOTE VISUAL INSPECTION SYSTEM

[75] Inventors: Donald D. Clemens, Thousand Oaks; Elmer M. Larson, Jr., Woodland Hills; William T. Morgan, Chatsworth; Oliver P. Steele, III, Canoga Park; Fred R. Wright, Simi, all of Calif.

[73] Assignee: Electric Power Research Institute, Inc., Palo Alto, Calif.

[21] Appl. No.: 319,529

[22] Filed: Nov. 9, 1981

[51] Int. Cl.³ .............................................. H04N 7/18
[52] U.S. Cl. .................................... 358/100; 376/248; 376/249
[58] Field of Search ........................ 358/100; 176/19 R

[56] References Cited

U.S. PATENT DOCUMENTS

| | | | |
|---|---|---|---|
| 3,075,113 | 1/1963 | Soar | 313/17 |
| 3,077,361 | 2/1963 | Tait et al. | 294/66 |
| 3,145,636 | 8/1964 | Hall et al. | 95/86 |
| 3,751,333 | 8/1973 | Drummond et al. | 176/19 |
| 3,769,156 | 10/1973 | Brecy | 176/19 |
| 3,780,571 | 12/1973 | Wiesener | 73/67.8 |
| 3,862,578 | 1/1975 | Schluter | 73/432 |
| 3,930,942 | 1/1976 | Thome | 176/87 |
| 3,987,666 | 10/1976 | Blanc et al. | 73/67.8 |
| 4,131,018 | 12/1978 | Muller et al. | 73/432 |
| 4,169,758 | 10/1979 | Blackstone et al. | 176/19 |
| 4,272,781 | 6/1981 | Taguchi | 358/100 |
| 4,281,342 | 7/1981 | Ueda | 358/100 |
| 4,302,772 | 11/1981 | Gillot | 358/100 |

Primary Examiner—Howard Britton
Attorney, Agent, or Firm—Henry Kolin; Clark E. DeLarvin; H. Fredrick Hamann

[57] ABSTRACT

A system for the remote visual inspection of a structure including two vessels, one disposed within the other and defining an annulus therebetween. A guide member is provided circumferentially about an upper periphery of the two vessels. Mounted on the guide member are two motor-driven, diametrically opposed trolleys which support a flexible track member which extends downwardly through the annulus from one of the trolleys and back up the other side of the annulus to the other trolley. At least one motor-driven carriage is mounted on the track member and carries a camera and light source. By appropriate positioning of the trolleys and the carriage, all the surfaces of the vessels defining the annulus are accessible for visual inspection by the camera. In accordance with a particular preferred embodiment, markers are placed at preselected points in the annulus on one of the vessels to permit verification of the location of the camera and carriage. Advantageously, the markers are in the form of a preselected pattern to provide verification of the clarity of the image being transmitted by the camera. In accordance with another preferred embodiment, the system further includes means for recording signals received from the camera and simultaneously recording the position of the camera.

8 Claims, 5 Drawing Figures

REMOTE VISUAL INSPECTION SYSTEM

BACKGROUND OF THE INVENTION

The present invention relates to a remote visual inspection system for certain areas of vessels which are not accessible for inspection by personnel. It particularly relates to the visual inspection of a storage arrangement wherein there is a primary vessel for containing a fluid and an outer vessel, generally referred to as the guard vessel, which surrounds the primary vessel to prevent loss of fluid in the event of a rupture or leak in the primary vessel.

There are many reasons why a primary vessel containing a fluid would be contained within a guard vessel. For example, if the fluid is hazardous or dangerous to the environment, the guard vessel acts to catch and retain the fluid in the event of a leak in the primary vessel. In addition, when the primary vessel contains a fluid which is at an extreme temperature, for example, either a cryogenic fluid or a high-temperature fluid, such as would be found in a nuclear reactor, the space between the primary and guard vessels acts to provide insulation and minimize the loss of heat from the primary vessel to the environment.

A liquid metal-cooled nuclear reactor presents a particularly difficult problem since the space between the two vessels is at a relatively high temperature, generally 200° C. or more. In addition, the space between the primary and guard vessels is maintained at a minimum. In the event of a rupture in the primary vessel, the fluid would drain into the annular space between the two vessels. This could create an extremely dangerous situation if the volume of the annular space allowed the fluid level in the primary vessel to reduce to a level to expose the reactor core. If the core is exposed, it would not receive sufficient cooling to prevent rupture and possibly melting of the core fuel assemblies, the result being fusion of the core. Thus, the space between the two vessels is maintained relatively small to prevent this possibility. The alternative is to maintain a sufficiently large inventory of coolant in the primary vessel to accommodate the volume of the annulus without exposing the reactor core, e.g., provide a larger and more expensive primary vessel.

To ensure continued safe operation of, for example, a nuclear reactor, periodic inspection at least of the primary vessel outer wall is required per the ASME Boiler Code, Section XI Division III. No reliable systems have been demonstrated for visually inspecting the narrow annulus that exists between a primary vessel and a guard vessel, particularly at the operating temperatures encountered in a nuclear reactor.

In addition to being able to inspect the interior of such an annulus, it also is necessary to know at all times precisely where the visual inspection device is located in order to compare, for example, current video tapes with video tapes made when the vessel was new. Further, in the case of nuclear reactors, the inspection system should not require any penetration in the guard vessel. The reason for this is that any such penetration could provide a source of leakage and defeat the purpose of the guard vessel.

Accordingly, it is an object of the present invention to provide a system which permits precise location of a remote visual inspection device for examining the annular space between a primary vessel and a guard vessel. It is another object of the invention to provide a remote visual inspection system which can withstand exposure to an extreme range of temperatures.

SUMMARY OF THE INVENTION

In accordance with the present invention, there is provided a system for the remote visual inspection of a structure including an upwardly extending primary vessel surrounded externally by an upwardly extending guard vessel. The outer wall surface of the primary vessel and the inner wall surface of the guard vessel define an annulus therebetween. The system comprises a guide means circumferentially located about an upper periphery of one of said vessels, upon which is mounted a pair of motor-driven, diametrically opposed trolleys. Suspended from the trolleys is an elongated flexible track member which extends downwardly through the annulus from one of the trolleys and back up the annulus to the other of the trolleys. The track member further includes an engagement means which extends from one end of the track member to the other. Mounted on the track member is at least one carriage, which includes, a motor connected to said engagement means. The carriage also includes one or more television cameras directed towards a portion of at least one and usually both of the vessels, and means for illuminating the portion of the vessel at which the cameras are directed. Means are also provided for synchronously driving the pair of motor-driven trolleys to maintain them diametrically opposed, and also for moving the carriage up and down the track member to any desired position, whereby selected movement of the trolleys and carriage will position the carriage anywhere within the annulus. Signals from the camera on the carriage are transmitted to a remote location to permit visual inspection of the surfaces of the vessel. Advantageously, there is also provided means for recording signals received from the camera, as well as the precise location of the camera to permit comparison with previous or subsequent visual inspections.

In accordance with a preferred embodiment of the invention, markers are placed at preselected points in the annulus on one or both of the vessels to permit verification of the location of the camera and carriage. Generally, the markers are in the form of a preselected pattern to also provide verification of the clarity of the image being transmitted by the camera. In some applications of the system it may be advantageous or necessary to provide means for either heating or cooling the camera to maintain it within a desired operating temperature.

DESCRIPTION OF THE PREFERRED EMBODIMENT

For convenience the present invention will be described with respect to its application to a nuclear reactor. It will be appreciated, however, that the system of the present invention also could be utilized in a variety of other types of facilities wherein two vessels define an annulus which are inaccessible to personnel. It is particularly well suited for a nuclear reactor since there are parts of the reactor such as weld seams and the like which must be inspected periodically and are inaccessible to personnel because of temperature, radiation, or space constraints.

Figure 1:
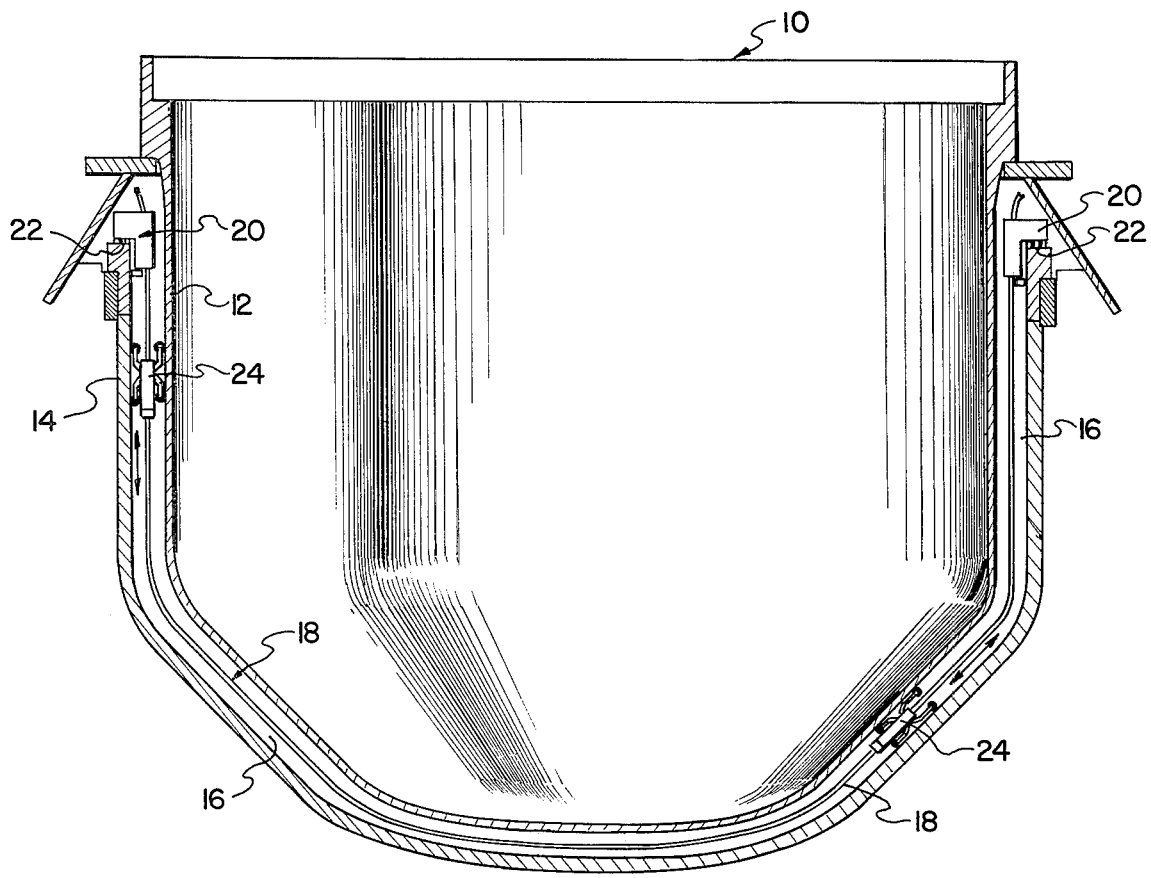
FIG. 1 is a schematic elevation view, partly in cross section, of a nuclear reactor arrangement provided with a system for remote visual inspection according to a preferred embodiment of the invention.
Figure 2:
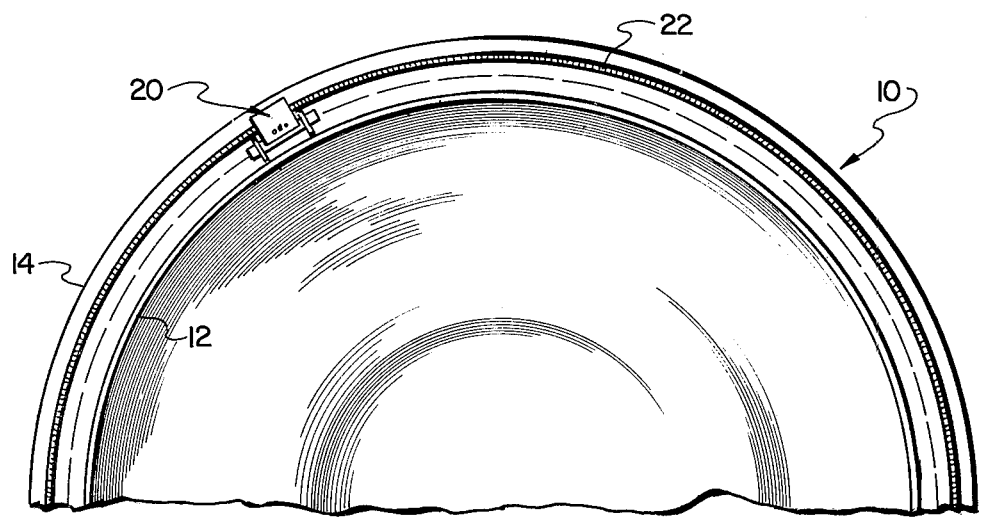
FIG. 2 is a partial plan view, partly in section, of the nuclear reactor arrangement shown in FIG. 1.
Figure 3:
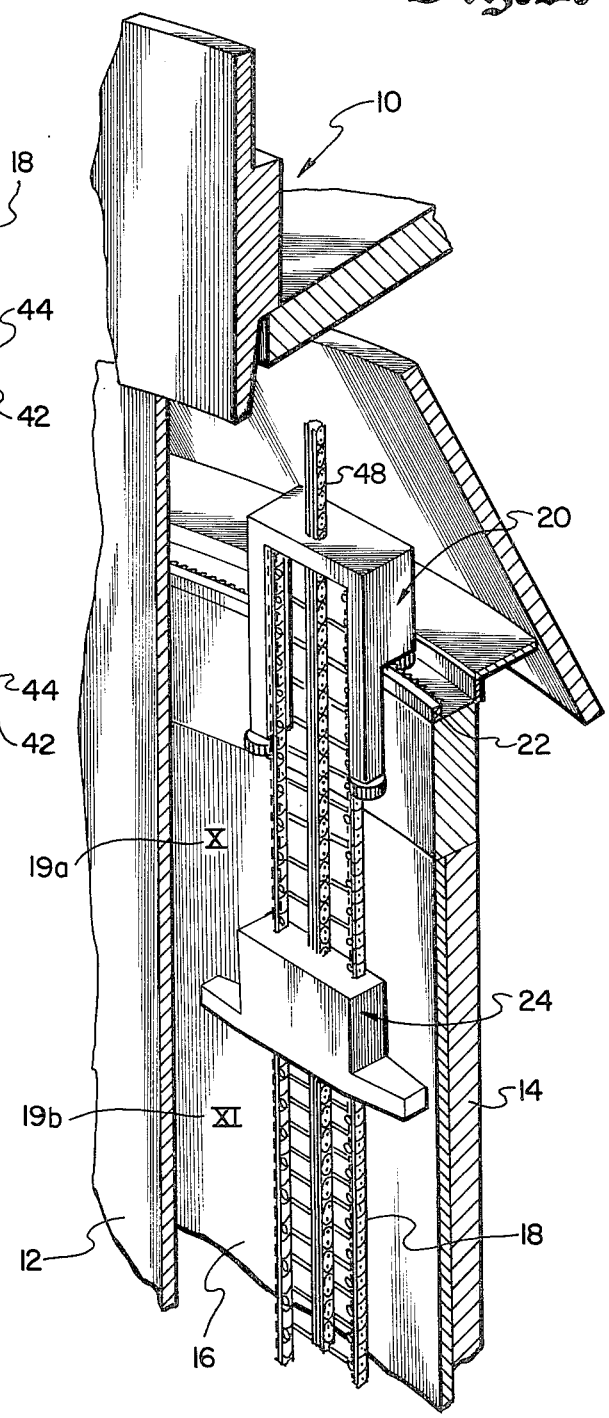
FIG. 3 is a perspective view, partially broken away, of a section of the nuclear reactor arrangement shown in FIGS. 1 and 2, showing construction details of the inspection system.

Referring to FIGS. 1 through 3, therein is depicted a nuclear reactor 10, for example, a liquid metal-cooled breeder reactor which includes, among other things, a primary vessel 12 for containing the reactor core, coolant, and other components not shown. Primary vessel 12 is surrounded by a guard vessel 14. The outer wall surfaces of primary vessel 12 and inner wall surfaces of guard vessel 14 define an annular space 16, generally referred to as the annulus. Preferably markers 19a and 19b are placed at preselected locations on at least one of the surfaces defining annular space 16, shown for purposes of illustration by arbitrary symbols X and XI, respectively. Suspended within annular space 16 is a flexible track member 18 which is supported by a pair of diametrically opposed motor-driven trolleys 20. Trolleys 20 are in turn supported on a guide means 22 which extends circumferentially about the upper periphery of guard vessel 14. Typically, guide means 22 will comprise a ring gear to permit accurate positioning of trolleys 20. Mounted on flexible track member 18 there is provided at least one and sometimes two carriage assemblies 24.

Figure 5:
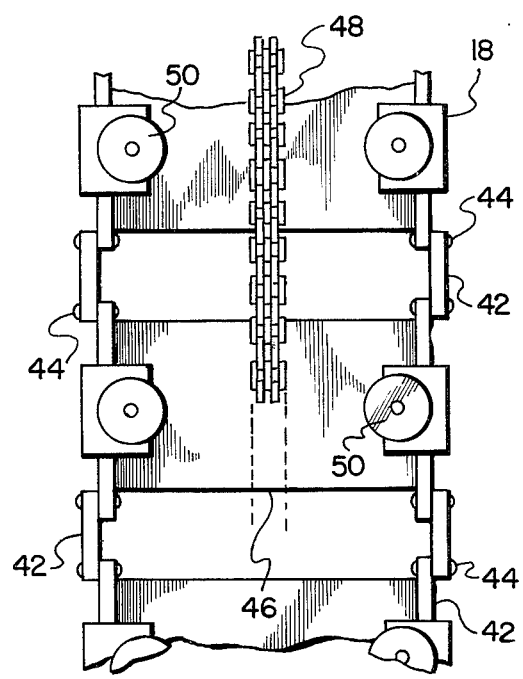
FIG. 5 is a plan view of a segment of the track member shown in FIG. 1, showing construction details.
Figure 4:
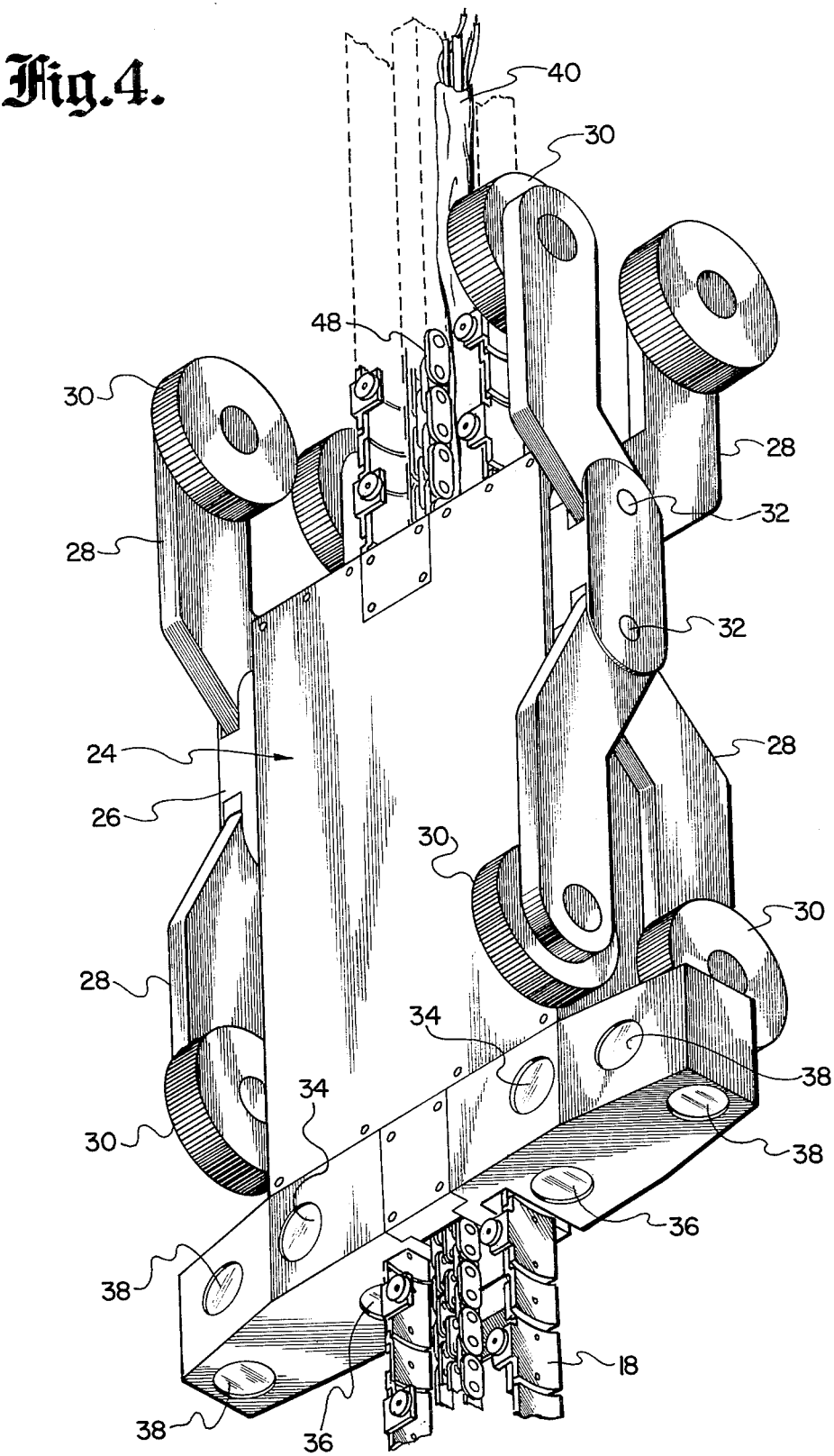
FIG. 4 is an enlarged, perspective view of a preferred embodiment of the carriage member and track member shown in FIG. 1, showing construction details.

Referring now to FIGS. 4 and 5 therein is shown more clearly the details of carriage assembly 24 and flexible track member 18. Carriage assembly 24 comprises a housing 26 which in this preferred embodiment also includes four arm assemblies 28, each of which is provided with a wheel 30 to minimize frictional forces when carriage assembly 24 is introduced into annular space 16. Advantageously, arm assemblies 28 are pivotally mounted on housing 26, for example, by hinge pins 32, and include means for biasing arms 28 outwardly (such as a spring or the like) to ensure that wheels 30 contact the wall surfaces of primary vessel 12 and guard vessel 14 to maintain carriage assembly 24 substantially centered in annular space 16. Housing 26 further includes one or more cameras such as closed circuit television cameras to permit remote viewing of annular space 16. For example, cameras 34 are provided on the top, and bottom in housing 26 for viewing the wall surfaces of primary vessel 12 and guard vessel 14 simultaneously. In addition, cameras 36 also may be provided on either or both ends of housing 26 for viewing the direction of travel of carriage assembly 24. Light sources 38 also are provided for illuminating the areas in which the respective cameras are directed. Located within housing 26 is a drive motor and drive sprocket for propelling carriage assembly 24 along track member 18. Power for the motor, cameras, and light source, and means for transmitting signals from the camera to a remote location are provided by a cable 40.

Referring now to FIG. 5, it is seen that in this preferred embodiment track member 18 comprises a parallel series of overlapping plates 42, which are pivotally connected at their overlapping ends by, for example, pins 44 to provide flexibility in a direction vertical to the lenth of track member 18. At selected points along track member 18 there are provided a plurality of stiffener plates 46 which interconnect the parallel series of overlapping plates 42. Stiffener plates 46 are connected to opposing plates 42 by any conventional means such as bonding, welding, riveting, or the like. Stiffener plates 46 provide rigidity to track member 18 in a direction lateral to its length. Various other arrangements to provide the combination of vertical flexibility and lateral rigidity will be readily apparent to those skilled in the art. Located intermediate the parallel series of plates 42, there is provided an engagement means for receiving the drive sprocket from carriage assembly 24. As depicted in this particular preferred embodiment, the engagement means comprises a double-width roller chain 48 which is attached to stiffener plates 46 at selected locations to maintain chain 48 in its intended position. Track member 18 further includes a plurality of guide members 50 spaced along its length to facilitate the movement of carriage assembly 24 and, further, to ensure that assembly 24 is maintained in appropriate relationship with track member 18 and chain assembly 48. As depicted, the plurality of guide members comprise a series of rotatable disc or wheels located on plates 42 and placed at selected intervals along track member 18.

During normal operation of nuclear reactor 10, annular space 16 is sealed off from the surrounding environment. To permit inspection in accordance with the present invention, there must be provided at least two diametrically opposed access ports with removable covers located adjacent an upper portion of annular space 16 to provide access to guide means 22. Generally, there will be provided from two to four diametrically opposed pairs of access ports to minimize the length of cable which must be introduced into annular space 16. After the reactor has been shut down and inspection is required, the covers are removed and two diametrically opposed motor-driven trolleys 20 are installed on guide means 22. A remote control cable is connected to the trolleys and they are then driven circumferentially about guide means 22 to ensure that there are no obstructions. Once it is determined that there are no obstructions, the trolleys are returned to the access ports. Using a previously installed pulling cable, one end of the cable is attached to flexible track member 18, and flexible track member 18 is fed into one access port and pulled by the cable down through the annulus under primary vessel 12 and up the other side of annulus 16 to the opposite access port. The cable is then removed and the ends of flexible track member 18 are attached to trolleys 20. At least one carriage assembly then is attached to track member 18. In some applications one carriage assembly is attached to track member 18 adjacent each of trolleys 20. A cable is attached to carriage 24 and the camera and light are checked to ensure that they are operating properly. Carriage assemblies 24 are then driven down through annular space 16 and signals from the camera are transmitted back through the cable to a remote station for simultaneous viewing and recording. A sufficient length of cable must be provided to allow trolleys 20 and carriage assembly 24 to travel their intended distance. Thus, the cable may be introduced from a spool, as required, or a sufficient length of cable can be suspended in annular space 16. The selection of feeding and guiding the cable is principally one of design choice.

As carriage assembly 24 proceeds down track member 18, previously placed markers 19a and 19b on the wall surfaces of vessels 12 and 14 are observed to confirm that the clarity and resolution of the visual signal being received is adequate to meet the desired objectives of the inspection and further verify the position of the cameras. Thereafter, trolleys 20 are rotated or driven simultaneously either clockwise or counterclockwise such that there will be some overlap of the area viewed by the camera and the procedure is repeated. In this manner the entire wall surfaces of the vessels defining annular space 16 are observable. In addition to television cameras, it will be appreciated that carriage assembly 24 also could be used to transport remote controlled tooling, such as grinders, welding equipment and the like, in the event that any repairs are necessary.

In a nuclear reactor, the temperature within annular space 16 may be as high as 200° C., which is higher than the operating temperature of most closed circuit television cameras. Accordingly, when the inspection system is used in a nuclear reactor it is necessary to provide some means for temperature control. Generally, this will be accomplished through passive control, for example, by insulating material placed in housing 26 and surrounding the cameras. Alternatively, of course, carriage assembly 24 could contain a cooling fluid or a continuous supply of cooling fluid could be introduced through a conduit in cable 40 and passed in heat exchange relationship with the camera.

Once the inspection has been completed, the trolleys are returned to an access port and carriage assemblies 24 removed. The pulling cable is attached to one end of track member 18 and the other end of the track member is withdrawn through the opposite access port. The pulling cable is then tied off in place for use when inspection is again required. Trolleys 20 are then removed and the access ports are sealed.

While the present invention has been described in terms of a specific example and what is now considered its best mode of practice, it will be appreciated by those skilled in the art that various changes and modifications are possible which will not depart from the spirit or scope of the inventive concepts taught herein.

Thus, the invention has been described, for example, with respect to a camera using a conventional light source. It will be appreciated, however, that it is within the scope of the present invention to utilize a camera which receives other types of electromagnetic radiation for display and recording. An example of such a camera would be one which was sensitive to nuclear radiation instead of light. A source of such radiation would then be provided, which source could be radiation from the core of a nuclear reactor.

Alternatively a camera could be utilized which responded to infrared radiation from a heat source, which again could emanate from the reactor core. Accordingly, while the invention has been described with respect to a particularly preferred application, in a nuclear reactor, it will have application to other systems or apparatus where inspection is required but, for reasons of temperature, space, or radiation, such areas are inaccessible to personnel. Thus, the foregoing description is intended to be illustrative only and should not be construed as limiting the scope of the invention, reference being made to the appended claims for this later purpose.

What is claimed is:

1. A system for the remote visual inspection of a structure including an upwardly extending primary vessel surrounded externally by an upwardly extending guard vessel, said vessels being spaced apart and defining an annulus therebetween, said system comprising;
   guide means located about an upper periphery of one of said vessels;
   a pair of motor-driven, diametrically opposed trolleys located on said guide means;
   means for driving said trolleys during operation of the system and maintaining said trolleys in diametrically opposed positions;
   an elongated flexible track member extending downwardly through said annulus from one of said trolleys and back up the annulus to the other of said trolleys, said track member having one end attached to one of said trolleys and another end attached to the other of said trolleys, said track member further including an elongated engagement means extending from one of said ends to the other of said ends;
   at least one carriage located on said track member, said carriage including a drive motor and means for connecting said drive motor to said engagement means for driving said carriage up and down said track member;
   a camera located on said carriage and directed towards a portion of at least one of said vessels;
   means for illuminating the portion of the vessel at which the camera is directed;
   means for providing power to the drive motor and camera and for transmitting signals from the camera; and
   display means for receiving signals transmitted from the camera to permit viewing of the portion of the vessel at which the camera is directed.

2. The system of claim 1 wherein markers are placed at preselected points in the annulus on at least one of said vessels to permit verification of the location of the camera and carriage.

3. The system of claim 2 wherein said markers are in the form of a preselected pattern to permit verification of the clarity of the image being transmitted by the camera.

4. The system of claim 1 wherein said guide means comprises a ring gear.

5. The system of claim 4 wherein said ring gear is mounted about the upper periphery of said guard vessel.

6. The system of claim 2 further including means for recording signals from the camera.

7. The system of claim 6 further including means for simultaneously recording the position of the camera.

8. The system of claim 1 further including means for cooling the camera.

* * * * *